US012741817B2

(12) United States Patent
Henry et al.

(10) Patent No.: US 12,741,817 B2
(45) Date of Patent: Sep. 22, 2026

(54) SYSTEM AND METHODS FOR MANAGING OBJECT TRANSPORT VEHICLE IN A FREIGHT HANDLING SYSTEM

(71) Applicant: FedEx Freight Corporation, Memphis, TN (US)

(72) Inventors: Kevin C Henry, Memphis, TN (US); Anthony J Hyatt, Memphis, TN (US); Dennis W Harner, Memphis, TN (US); Benjamin Krone, Memphis, TN (US); Jason Honeycutt, Memphis, TN (US); Sankeerth Chilukuri, Memphis, TN (US); Ankit Sikka, Memphis, TN (US); Neal Tucker, Memphis, TN (US); Trenton C Fox, Memphis, TN (US)

(73) Assignee: FEDERAL EXPRESS CORPORATION, Memphis, TN (US)

( * ) Notice: Subject to any disclaimer, the term of this patent is extended or adjusted under 35 U.S.C. 154(b) by 275 days.

(21) Appl. No.: 18/733,487

(22) Filed: Jun. 4, 2024

(65) Prior Publication Data

US 2025/0368448 A1 Dec. 4, 2025

(51) Int. Cl.

| | |
|---|---|
| ***B65G 1/137*** | (2006.01) |
| ***B65G 67/20*** | (2006.01) |
| ***G06Q 10/08*** | (2024.01) |

(52) U.S. Cl.

CPC ........... *B65G 1/1378* (2013.01); *B65G 67/20* (2013.01); *G06Q 10/08* (2013.01)

(58) Field of Classification Search

CPC ...... B65G 1/1378; B65G 67/20; G06Q 10/08; G06Q 10/083; G06Q 10/0631

See application file for complete search history.

(56) References Cited

U.S. PATENT DOCUMENTS

| | | | | |
|---|---|---|---|---|
| 2003/0217870 A1 | | 11/2003 | Ridling | |
| 2006/0106742 A1* | | 5/2006 | Bochicchio ............ | G06Q 10/08 177/136 |

(Continued)

OTHER PUBLICATIONS

International Search Report for PCT/US2025/029027, dated Jul. 28, 2025 (eleven pages).

*Primary Examiner* — Timothy R Waggoner

(74) *Attorney, Agent, or Firm* — FINNEGAN, HENDERSON, FARABOW, GARRETT & DUNNER, LLP

(57) ABSTRACT

Disclosed are methods and systems for determining a next work assignment for an object transport vehicle in a freight handling system. The method includes defining a series of rules. The method include receiving a request for a next work assignment using an object transport vehicle. The method includes sending the next work assignment to an object transport vehicle to load freight. The method may include identifying an order of work assignments. The method includes determining a status of the destination trailer. The method includes determining whether a shipment comprises of one piece or more than one piece. The method includes sending an instruction to load a piece of freight. The method includes verifying one or more rules for determining a new work assignment. The method includes receiving information with a new work assignment. The method includes sending the new work assignment for the object transport vehicle.

20 Claims, 6 Drawing Sheets

(56) References Cited

U.S. PATENT DOCUMENTS

| | | | | |
|---|---|---|---|---|
| 2009/0059004 | A1* | 3/2009 | Bochicchio | B66F 17/003 348/148 |
| 2010/0057592 | A1* | 3/2010 | Moir | G06Q 10/0832 340/572.1 |
| 2013/0124430 | A1 | 5/2013 | Moir et al. | |
| 2016/0224930 | A1* | 8/2016 | Kadaba | G06Q 10/083 |
| 2021/0149401 | A1 | 5/2021 | Kitamura | |

* cited by examiner

SYSTEM AND METHODS FOR MANAGING OBJECT TRANSPORT VEHICLE IN A FREIGHT HANDLING SYSTEM

TECHNICAL FIELD

The present disclosure generally relates to real time location systems. In particular, embodiments of the present disclosure relate to methods, systems, and devices for managing the operations of an object transport vehicle by utilizing a series of defined rules for determining a next work assignment for the object transport vehicle (e.g., a forklift) in a freight dock setting.

BACKGROUND

The efficient, safe, and secure shipment of freight, including but not limited to correspondence, materials, goods, components, and commercial products, is a key component in today's business, particularly in view of the international nature of most business enterprises. Yet current methods and systems often require an extensive amount of travel by a forklift, when attempting to transport goods. Before the freight reaches its destination, it can be managed by one or more different entities such as truck companies, intermediate consolidators, railways, shipping companies and airlines. The parcels of freight can be transferred between different entities at different transfer points or hubs. At each hub, the parcels can be separated and transferred by different vehicles to different destinations. The parcels can be unloaded from a vehicle and then loaded onto another vehicle one or more times.

Current systems and methods have difficulty providing adequate instructions to efficiently manage the operations of a forklift, for example, concerning a next best action available immediately after a previous work assignment has been completed, which decreases the efficiency of forklift use. This is a longstanding problem within the art regarding how current systems operate, including how to efficiently determine the next best action generated by the system to improve overall operations. Additionally, there are technical issues associated with current systems. For example, current systems take too much time to conduct the operations of providing instructions to a forklift operator for determining a next best action available and consume substantial computer memory, which increases the amount of processing time to determine the next best action. This further impacts the inefficiency relating to the forklift operations, wasting time and additional resources such as energy, fuel and manpower. Accordingly, current methods are inefficient and time consuming.

Current methods do not minimize the amount of travel without freight on one or more forklift blades or enable succinct orchestration of forklift movements on a freight dock. Further, current methods do not successfully track packages in real time during such operations.

It is therefore desirable to instruct a forklift operator to perform the most readily available work action immediately after a current work action is completed, using a computer-based system that can efficiently coordinate freight movements and track packages in real time. Existing solutions may not provide sufficient accuracy when determining which shipments to be coordinated or efficient processing times that can effectively transport freight movements at a dock. Furthermore, solutions are needed to minimize the amount of travel without freight on the forklift blades and overall operational time for the computer system. Further, solutions are needed to allow for minimizing fuel use and employee time, since the amount of time that a forklift has no freight is dramatically reduced due to greatly improved processing times that reduce unnecessary time being spent during these operations.

SUMMARY

Embodiments of the present disclosure provide a computer-implemented method including a memory for storing instructions. The method may comprise one or more processors that may be configured to execute the instructions to: defining, using at least one processor, a series of one or more rules, the series of one or more rules weighted by one or more weights; receiving from a user device associated with an object transport vehicle, a request for a next work assignment; sending, to the user device, the next work assignment for the object transport vehicle to load freight at a freight dock; identifying an order of one or more subsequent work assignment dependent upon one or more conditions. The one or more conditions may be based on information associated with the next work assignment sent to the user device associated with the object transport vehicle. That information may include a number of pieces of freight associated with at least one of the one or more subsequent work assignments, one or more locations of all of the one or more pieces of freight associated with at least one of the one or more subsequent work assignments, a destination trailer for loading the one or more pieces of freight, or a destination trailer status for the object transport vehicle. The method may further include determining from a user associated with the user device, a status of the destination trailer based on or more conditions to determine an order in which pieces of freight are to be loaded; based on determining that the status is a first status: determining whether the freight associated with at least one of the one or more subsequent work assignments comprises one piece. That information may further be based on determining that the freight comprises one piece, sending a loading assignment to the user device to load the one piece of freight; That information may further be based on determining that the freight comprises more than one piece, performing at least one of: sending an instruction to the user device associated with the object transport vehicle to select a bay location to load a first piece of freight, sending an instruction to the user device associated with the object transport vehicle to load a piece of freight to a location where the first piece was loaded, or sending an instruction to the user device for the object transport vehicle to load a piece of freight to a location adjacent to the location that the first piece was loaded; based on determining that the status is a second status, sending an instruction to the user device to load a piece of freight to one of a trailer or a bay; The method may further include verifying the one or more rules for determining a new work assignment that is not assigned; receiving, information associated with the new work assignment, the information being based on the determination that there is no weight on any blades of the object transport vehicle; and sending to the user device associated with the object transport vehicle, the new work assignment for the object transport vehicle.

Embodiments of the present disclosure provide a computing system including a memory for storing instructions. One or more processors may be configured to execute the instructions to: define, using at least one processor, a series of one or more rules, the series of one or more rules weighted by one or more weights; receive from a user device associated with an object transport vehicle, a request for a next work assignment; send, to the user device, the next work assignment for the object transport vehicle to load freight at a freight dock;

The system may identify an order of one or more subsequent work assignment dependent upon one or more conditions. The one or more conditions may be based on information associated with the next work assignment sent to the user device associated with the object transport vehicle. That information may include number of pieces of freight associated with at least one of the one or more subsequent work assignments; one or more locations of all of the one or more pieces of freight associated with at least one of the one or more subsequent work assignments; a destination trailer for loading the one or more pieces of freight; or a destination trailer status for the object transport vehicle;

The system may further determine from a user associated with the user device, a status of the destination trailer based on or more conditions to determine an order in which pieces of freight are to be loaded; That information may be further based on determining that the status is a first status: determining whether the freight associated with at least one of the one or more subsequent work assignments comprises one piece; That information may be based on determining that the freight comprises one piece, sending a loading assignment to the user device to load the one piece of freight; That information may be based on determining that the freight comprises more than one piece, performing at least one of: send an instruction to the user device associated with the object transport vehicle to select a bay location to load a first piece of freight, send an instruction to the user device associated with the object transport vehicle to load a piece of freight to a location where the first piece was loaded, or send an instruction to the user device for the object transport vehicle to load a piece of freight to a location adjacent to the location that the first piece was loaded; That information may be based on determining that the status is a second status, sending an instruction to the user device to load a piece of freight to one of a trailer or a bay;

The system may verify the one or more rules for determining a new work assignment that is not assigned; receive, information associated with the new work assignment, the information being based on the determination that there is no weight on any blades of the object transport vehicle; and send to the user device associated with the object transport vehicle, the new work assignment for the object transport vehicle.

It is to be understood that both the foregoing general description and the following detailed description are exemplary and explanatory only and are not restrictive of the disclosed embodiments, as claimed.

DETAILED DESCRIPTION

Figure 1:
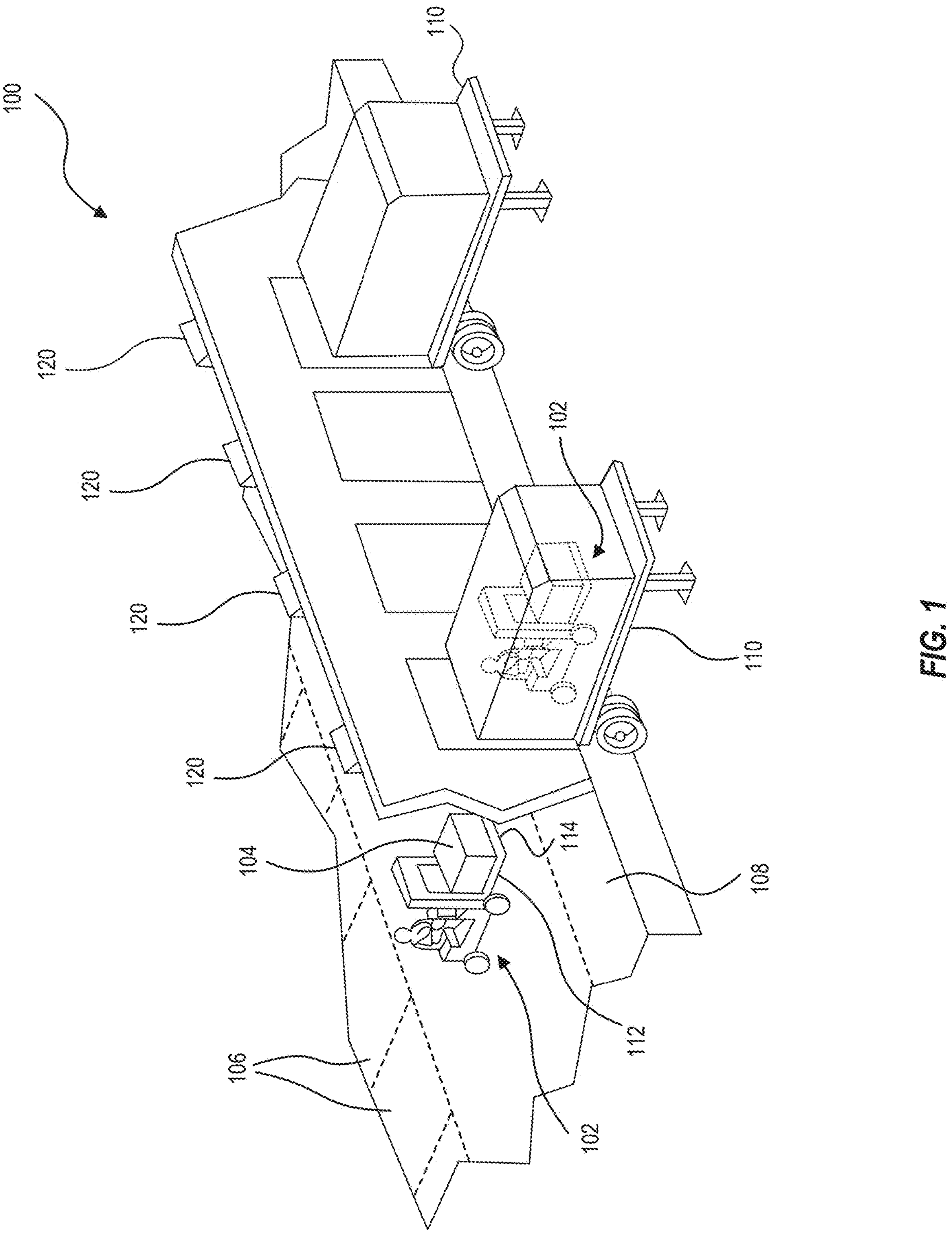
FIG. 1 is a schematic representation of a worksite, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations, and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Current systems and methods include a real-time location system (RTLS). An RTLS as used herein, in some embodiments, may refer to a computer or computer based system configured to identify and track the locations of objects or people in real time, typically within a building or contained area. For example, such a system may be implemented for a freight dock of a shipping facility that is responsible for transporting different goods to different points within the facility. The transport of these goods can be done using an object transport vehicle, which in some embodiments may refer to a vehicle that transports goods throughout the facility. The RTLS can also provide different statuses that represent whether the operations have fulfilled one or more conditions that can determine the next best work action. A status as used herein may, in some embodiments, refer to a current state of the RTLS, which includes information regarding subsequent assignment actions to be accepted.

The RTLS utilizes a network of connected hardware and software components that track the locations of objects within a defined area (e.g., shipping facility). To enable indoor implementation of the RTLS, it may be configured to utilize technologies such as ultra-wideband (UWB), Bluetooth, or Wi-Fi that enable wireless communication between a group of transmitting, receiving, and dual-purpose transceiving devices to determine the location of an object. Object as used herein may, in some embodiments, refer to goods or freight that is transported in an object transport vehicle. The transmitting device, e.g., an RF tracking tag can send out location data as encoded RF transmissions of freight movements in the shipping facility at a continuous interval. The RTLS also utilizes receivers that can be deployed in fixed positions, such as mounted on walls, and within the communication range will read received signals from the transmitting device. The location data, and in certain applications, accompanying IoT data (temperature, battery, etc.), received by the receivers, can be forwarded to location engine software to calculate device transmitting positions.

The RTLS can utilize a variety of techniques to determine location. For example, this can include distance-based calculations such as time difference of arrival, which can deliver more accurate results than Received Signal Strength Indicators (RSSI), among other positioning methods. For example, the distance between the forklift operator's current location and initial location is determined using cartesian coordinates whose reference point is determined on a service center basis. In some embodiments, the distance value between two points such as a forklift's mid-point (X1,Y1)

and a destination location (X2,Y2) is calculated using a formula such as: $((X2-X1)^2+(Y2-Y1)^2)^{(1/2)}$. The forklift's mid-point (also sometimes referred to as Center of Mass or COM) is determined by a separate (for example, a "SLAT" or "Shipment to Lift Association Technology" system).

In some embodiments, the SLAT system is responsible for tracking and monitoring the location of the forklifts at the facility. In some embodiments, the SLAT system may receive data from one or more sensors, RFID tags, or the like, installed on object transport vehicles. In some embodiments, the SLAT system may also collect, process, and analyze location data associated with the received data. For example, the SLAT system accepts data (e.g., RFID tag reads) from the RTLS as inputs. The SLAT system may aggregate tag reads to pair shipments to the object transport vehicles. In some embodiments, the SLAT system may determine the distance between the object transport vehicles and zones at the shipping facility, using, for example, the coordinates of the object transport vehicles's midpoint. In some embodiments, the SLAT system and/or RTLS may calculate the object transport vehicle's midpoint using RFID tags that are located at the front and rear of the object transport vehicle. The object transport vehicle's mid-point can be a fixed reference point or sensor on the object transport vehicle; the midpoint can assist with triangulating the position of the object transport vehicle by accurately measuring the distance from one or more reference points or sensors that are installed throughout the facility.

The RTLS can include numerous tracked assets, so that a location engine can process data associated with the tracking of objects, concurrently for real-time location tracking of numerous assets at the same time. Location data can then be used to display the locations of tracked items on a map or integrated into various technological applications to enable multiple location-aware use cases. Location data as used herein, in some embodiments, may refer to information about the specific geographical location of a device or asset that is collected and tracked by a GPS in a network. The RTLS can also rely on fixed transmitting devices, such as Bluetooth beacons, which broadcast signals at regular intervals that can be detected by other Bluetooth low energy (BLE)-enabled devices such as smartphones. Bluetooth low energy as used herein, in some embodiments may refer to a power-conserving variant of Bluetooth personal area network (PAN) technology that is designed for use by internet-connected machines and appliances. Location data from the Bluetooth beacons can also be collected by those BLE-enabled devices and forwarded to an indoor positioning application to determine the device's position and trigger specific actions such as the next best action.

In general, the RTLS employs a combination of hardware, software, and communication technologies to determine and provide the real-time location of tagged items within a defined area of interest. The RTLS is a computer based system that can be implemented using a tablet or computer that are configured to be used as mobile devices that can run the software or application that communicates with the RTLS. The RTLS utilizes wireless communication systems to accurately identify and track freight movements in real time within a warehouse or shipping facility. The RTLS can include various technical components such as a processor that enables the management of data that is received, which function as a device that can receive signals from at least one or more RF tracking tags and updates the system in real-time. RF tracking tags as used herein, in some embodiments, may refer to a type of tracking system that uses radio frequency to search, identify, track, and communicate with items and people. The RTLS includes RTLS specific computer software that processes the information received from the readers and enables the detection of the locations of objects. This software can include a graphical user interface (GUI) to enable a user to view pertinent information such as real-time information and location data. It enables processing location data from a software server. Examples of various software packages or modules that can be used for an RTLS include CenTrak, Ubisense, Cisco Connected Mobile Experiences and ZebraMotionWorks.

FIG. 1 illustrates a worksite 100, consistent with the disclosed embodiments. The worksite 100 may include one or more areas where one or more vehicles, such as forklifts 102, may load or unload one or more objects, such as shipments 104, packages, or other freight. For example, one forklift 102 may be used to pick up one or more shipments 104 at one location within the worksite 100 and transport the shipment(s) 104 to another location within the worksite 100.

It is to be understood, however, that vehicles other than forklifts may be used to transport shipments 104. For example, other manned, semi-autonomous, or autonomous (unmanned) vehicles may be used to transport shipments 104, such as hand-trucks, carts, trailers, motor vehicles, robotic machine tending systems, flatbed truck, rail vehicle, trailer, cargo van, tanker, freight car, a commercial truck, or a standard less-than-load (LTL) truck. Such vehicles may also be referred herein as "object transport vehicles."

Forklift 102 may also include blade 114. A "blade" as used herein, in some embodiments, may refer to specialized equipment that comprises of a horizontal part of a fork or other lifting mechanism of an object transport vehicle which lifts and supports the load. In some embodiments, the blade 114 may refer to any portion of the object transport vehicle that can properly extend and carry any freight. Blades 114, in some embodiments, may include one or more sensors to enable the object transport vehicle (e.g., a forklift) to detect how much weight is on the blade 114. In some embodiments, the blades 114 may include a sensor that indicates either "weight" or "zero weight," or may include a sensor that indicates an amount of weight carried on the blade 114 (e.g., in ounces, grams, or any other system of measurement).

The worksite 100 may be at least partially located in a warehouse or other structure or building, as shown in FIG. 1. Alternatively, the worksite 100 may be partially or entirely outdoors. The worksite 100 may include one or more locations or zones where the shipments 104 may be unloaded and stored, either temporarily or for longer periods of time. For example, depending on the layout of the worksite 100, the forklifts 102 may transport the shipments 104 to and from different lanes 106, loading bays, docks 108, or other storage areas, or to and from other object transport vehicles 110 (e.g., trailers, trucks, aircraft, ships, or other delivery vehicles, etc.) at the worksite 100. Although the worksite 100 shown in FIG. 1 includes a warehouse and surrounding area, it is to be understood that the worksite 100 may cover a larger area including multiple buildings.

In an embodiment, the worksite 100 may be a receiving and/or shipping facility, distribution center, or hub where the shipments 104 are received and/or shipped. One or more of the forklifts 102 may transport the shipments 104 within the worksite 100 so that the shipments 104 are loaded into appropriate delivery vehicles leaving the worksite 100 or loaded into the appropriate storage areas within the worksite 100. Alternatively, it is to be understood that objects other than shipments may be transported and tracked using the systems and methods described below. Other inventory and objects may be tracked, depending on the specific application. The worksite 100 may include one or more readers 120 configured to receive wireless signals from wireless devices associated with an object transport vehicle (e.g., forklift 102) and an object (e.g., shipment 104), as will be described in further detail below.

One or more shipment 104 may be placed on and supported by a pallet 112 which may be loaded onto and unloaded from the forklifts 102. Alternatively, the forklifts 102 may include or carry another type of platform or surface on which the shipments 104 may be placed.

Disclosed embodiments may involve determining a next work assignment for an object transport vehicle 102 in a freight handling system. Rules as used herein may, in some embodiments, refer to predefined guidelines or instructions containing algorithms for implementation by the RTLS. For example, such guidelines may be implemented to determine how freight within a dock can be effectively managed during an operational process. A device, such as reader 202 and/or a controller 204 (discussed below with respect to FIG. 2) may selectively assign weights to these rules against each other, in order to modify how they are implemented. Reader 202 and/or controller 204 may then combine the rules and weights to appropriately determine the next best action for the work assignment to be assigned to the forklift operator. The weights as used herein may, in some embodiments, represent values that can be used to determine costs associated with the shipping and handling, determine the distribution of loads, and ensure appropriate compliance with local weight limits for freight. The RTLS enables for optimization of assigned actions to minimize the amount of travel by the forklift operator while not transporting freight. Once any assigned action is completed, a new assignment may be subsequently issued. The rules can be defined using distinct types of data, as further explained below. A work assignment as used herein may, in some embodiments, refer to an assigned work task that is to be completed at a dock. The work assignment occurs upon assigning numerous object transport vehicles to numerous shipments based on one or more distinct factors such as capacity, weight, distance, and deadlines associated with the delivery of objects within the freight. An example is defining a rule to use data that provides the current work assignments for all individual forklift operators at a freight dock. The rule then prioritizes the action of disallowing one or more forklift operators that are to be assigned to actions in the same door or trailer location.

A object transport vehicle as used herein may, in some embodiments refer to a vehicle responsible for moving freight. For example, an object transport vehicle can be any vehicle that can transport a large amount of goods such as a flatbed truck, rail vehicle, trailer, cargo van, tanker, freight car, a commercial truck, or a standard less-than-load (LTL) truck. A freight handling system as used herein may, in some embodiments, refer to a system that is responsible for the management of the processing of freight. This can further include sorting, loading, unloading, and tracking.

Disclosed embodiments may involve defining a series of one or more rules, the series of one or more rules weighted by one or more weights. Series as used herein may, in some embodiments, refer to a group of related rules that share common characteristics. In some embodiments, at least one of the one or more rules is configured to prioritize freight from a given bay or freight from a trailer. For example, any bay at the freight dock where the forklift operator is located, may contain freight that needs to be relocated. A bay's freight is determined to need relocation when the bay will be needed by desired movements, or the freight needs to be relocated into a trailer for transportation. An additional rule may be that the trailer is eligible to be unloaded or emptied. For example, eligibility for a trailer to be unloaded is defined by data from external systems. These rules are implemented by the RTLS described above. For example, as output, the rule prioritizes one of the following actions: Unload freight from a given bay; and unload freight from a given trailer.

In some embodiments, at least one of the one or more rules is defined according to a delta value consisting of a current time and a cut time, wherein the cut time includes the time that the trailer is required to depart the freight dock. For example, the delta between the current time and the cut time can represent a lower delta. In some embodiments, the one or more rules includes the action of prioritizing when a user associated with a user device is notified of when the next work assignment has been withdrawn from the freight dock. A lower delta value increases the prioritization of which work assignments should be assigned. In some embodiments, the one or more rules comprise determining whether an action prioritizes a duration exceeding a configurable amount, and in response the action is reassigned to an alternate object transport vehicle by notifying that an assignment has been withdrawn from a current object transport vehicle. Furthermore, in some embodiments, the RTLS may issue assignments after receiving an event indicating that the object transport vehicle operator has completed their current task. In some embodiments, the RTLS performs tracking (e.g., in real-time) and instant notifications to further reduce delays. This has the effect of minimizing restraints on the duration between the event and the assignment being issued. For example, the RTLS may utilize geo-fencing to enable automatic trigger notifications for assignments when there is a particular location is reached or when the event occurs.

An alternate object transport vehicle, as used herein, in some embodiments may refer to an object transport vehicle that is provided with a reassigned action upon the duration of a prioritization exceeding a set time. A prioritization, as used herein, in some embodiments, may refer to the ranking and selection of which work assignments are determined to be optimal. For example, this can represent the duration of time that passed since a first freight was unloaded from a trailer at the freight dock, where a forklift operator is located. A much longer duration results in a higher prioritization of which work assignment should be assigned. The rule prioritizes the action of having to unload freight from a given trailer. The rule can be further defined with data that represents the duration between when an assignment was issued to a forklift operator and the current time. For example, this can represent the distance between the forklift operator's current location and the assigned work assignment's initial location. This rule prioritizes the action of being reassigned to a different forklift operator and the current forklift operator is then notified that their work assignment has been withdrawn. This is done once the duration exceeds a set time. When the action of the work assignment is distant or not closely located for example, then this action is negated or not taken into consideration.

Disclosed embodiments may involve the RTLS receiving from a user device (such as a tablet or a computer with a web browser associated with an object transport vehicle), a request for a next work assignment. A user device as used herein, in some embodiments, may refer to a mobile or other handheld device (e.g., cell phone, smartphone, tablet, laptop, etc.). A request as used herein may, in some embodiments, refer to an internal notification that is initiated by the forklift operator to schedule a shipment or schedule a next work assignment. For example, the request may initiate a process for managing the numerous shipments or obtaining information related to the status of the shipments or next work assignments. For example, the RTLS (Real-Time Location System) may request for optimized assigned actions that are responsible for minimizing the amount of travel done by the forklift to minimize the amount of travel without freight on blade 114 and overall operational time.

Disclosed embodiments may involve the readers of the RTLS system sending to the user device (such as a tablet or a computer with a web browser), the next work assignment for an object transport vehicle to load freight at a freight dock. A freight dock as used herein may, in some embodiments, refer to an area or location where the freight is loaded and unloaded from the numerous object transport vehicles. This information can be sent to the object transport vehicle via a display screen of the forklift.

Disclosed embodiments may involve the RTLS identifying an order of one or more subsequent work assignments dependent upon one or more conditions, the one or more conditions based on information associated with the next work assignment sent to the user device associated with the object transport vehicle. Conditions as used herein may, in some embodiments, refer to requirements to be met for a work assignment to be completed. For example, when a forklift operator is assigned an action of having to load freight to a trailer, the RTLS identifies an optimal order of subsequent assignment actions based on various conditions. In order for the RTLS to successfully identify the optimal order of assignment actions, it requires pertinent information such as the number of pieces of freight associated with at least one of the one or more subsequent work assignments. Other necessary information for the RTLS includes determining the possibly multiple locations (e.g., one or more destination trailers), all of the pieces of freight, a destination trailer for loading the one or more pieces of freight, and the destination trailer status for the object transport vehicle. In some embodiments, the status of the destination trailer comprises one or more statuses grouped according to fulfillment of one or more conditions. Furthermore, the RTLS will then follow the one or more conditions to determine the optimal work assignment's order. The conditions are then further divided into two individual statuses. For example, these individual statuses can be broken down into a "Status A" and a "Status B". The RTLS operates by utilizing two unique statuses known as both "Status A" and "Status B" to efficiently manage and optimize the arrival and departure of trailers at a shipping facility. In some embodiments, status "A" and status "B" act as placeholders. For example, the RTLS may include a map associating each status to specific status codes based on the previously-mentioned conditionals. The RTLS operates based on these conditionals to determine the optimal assignment order.

More specifically, for example, if the destination trailer is indicated to be in "Status A" along with the determination that there is only one piece of freight, then the RTLS receives a loading assignment for that freight that is then provided to the forklift operator. In the event that the destination trailer is present in "Status A" and there are multiple pieces of freight, then the RTLS may utilize additional conditionals to conduct operations. For example, if the freight is determined to only consist of one piece and it is to be unloaded, then the forklift operator can select which bay location to load the freight.

If the freight is not the first or the last piece unloaded, then the forklift operator is instructed by the RTLS to load the freight to a location where the first piece was successfully loaded. If the freight is the last piece of freight to be unloaded, then the forklift operator is instructed by RTLS to load the freight to the trailer adjacent to the bay that the first piece was loaded.

If the destination trailer is in "Status B," then the system may instruct the operator to either load to a trailer or bay dependent upon the status of the other pieces of freight. Conditions as used herein may, in some embodiments refer to statements or expressions that can enable for various actions to be taken depending on whether a specific condition satisfies a certain criterion.

Disclosed embodiments may involve determining a status of the destination trailer based on or more conditions to determine an order in which pieces of freight are to be loaded. For example, a user associated with the user device may provide the status of the destination trailer. The status of the trailer can be cached by the system located at each service center and is populated by a stream of one or more business events from upstream applications. The trailer status indicates details necessary for the determination of the next work assignment such as whether the trailer is arriving at the service center or whether that trailer is eligible for unloading. In some embodiments, the status of the destination trailer comprises one or more statuses grouped according to fulfillment of one or more conditions. This can be based on determining that the status is a first status determining whether the freight comprises one piece. This determination will then cause the loading assignment of the user device to load the one piece of freight. For example, if the destination trailer is present in "status A" and there is only an individual piece of freight within the freight, the subsequent assignment action of "loading" for that freight will be provided to the forklift operator. In some embodiments, this may involve sending an instruction to the user device associated with the object transport vehicle to select a bay location to load a first piece of freight. In some embodiments, the one or more rules are defined by utilizing data associated with a bay's freight, the RTLS providing at the bay's freight a determination of when to relocate based on historical characteristic data predicting desired movements or relocation into the trailer, and sending an instruction to the user device associated with the object transport vehicle to load a piece of freight to a location where the first piece was loaded. Furthermore, this may involve sending an instruction to the user device for the object transport vehicle to load a piece of freight to a location adjacent to the location that the first piece was loaded and based on determining that the status is a second status, it may involve sending an instruction to the user device to load a piece of freight to a trailer or a bay. A first and second status as used herein, may refer in some embodiments to both status A and status B, respectively.

For example, if the destination trailer is in "status A" and there is more than one piece of freight, the RTLS applies additional conditions. These additional conditions applied by the RTLS include determining if the freight is the first piece to be unloaded and if so, a forklift operator instructing to select which bay location to load the freight. If the freight is not the first or last piece to be unloaded, then the operator can be instructed to load the freight to the location that the first piece was loaded. If the freight is the last piece to be unloaded, then the operator is instructed to load the freight to the trailer adjacent to the bay that the first piece was loaded. If the destination trailer is located in "status B," then the RTLS instructs the operator to load to a trailer or a bay based on the status of the other pieces of freight. In some embodiments, the trailer is eligible to be emptied based on at least one of historical usage patterns of the trailer, past supply levels required for emptying the trailer, or distribution of items within the trailer.

Disclosed embodiments may involve receiving information associated with a new work assignment, the information being based on a determination of one or more weights on a blade 114 for the object transport vehicle. For example, if there is a determination that there is no weight on blade 114, this means that the object was successfully loaded on the trailer, which enables for the RTLS to search for an assignment. In some embodiments, combining the one or more rules and associated weights are done to determine the subsequent work assignment that is assigned to the user device. For example, the RTLS will then verify the one or more rules for determining a new work assignment that is not assigned based on the one or more conditions described above and provide the work assignment to the forklift operator on the fork-lift operator device's computer screen. In some embodiments, the subsequent work assignment includes a new assignment being issued upon the action being successfully completed. Furthermore, the process is completed upon sending to the user device associated with the object transport vehicle, the new work assignment for the object transport vehicle.

Figure 2:
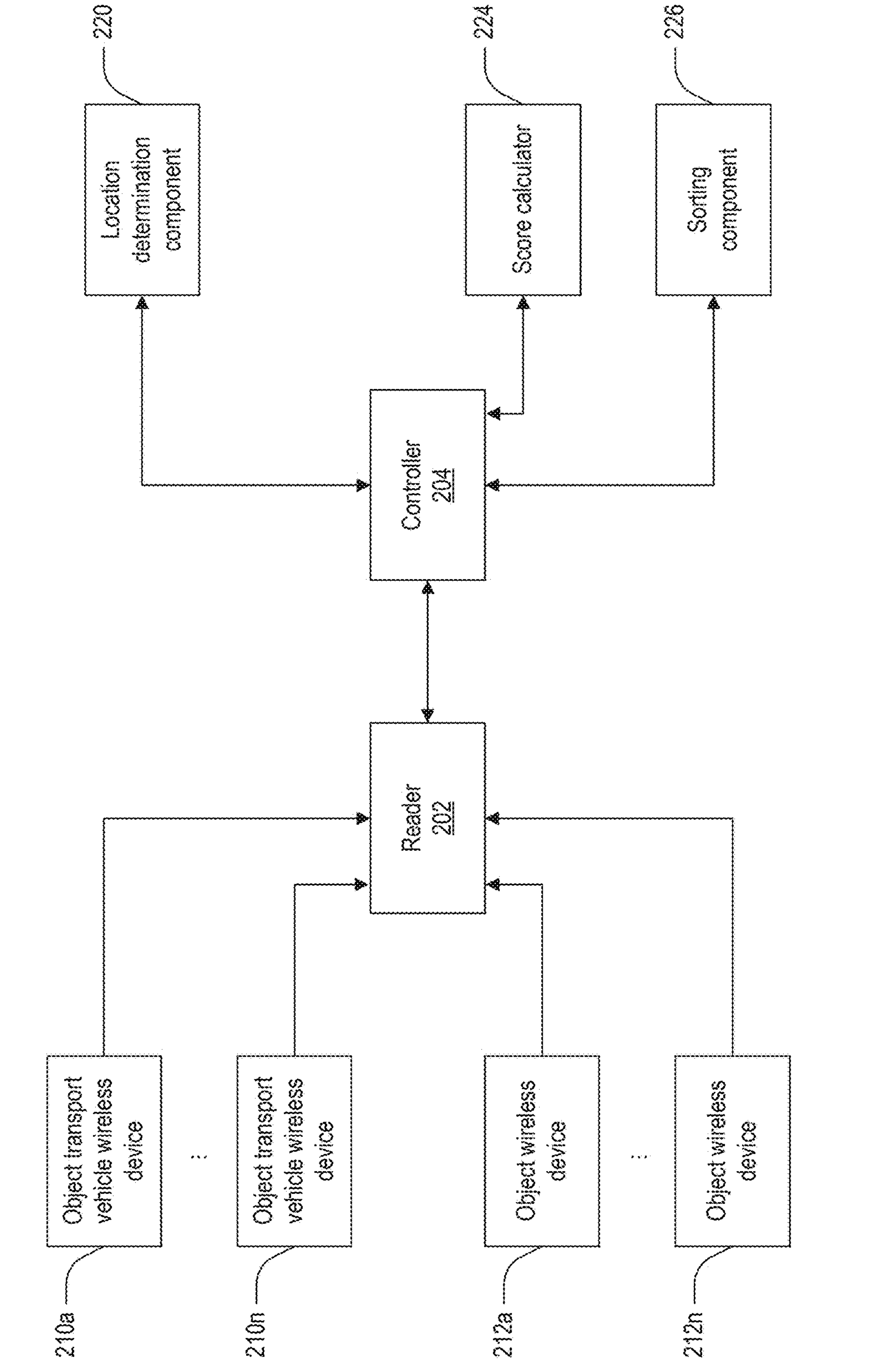
FIG. 2 is a block diagram of an object tracking system, consistent with the disclosed embodiments.

FIG. 2 is a block diagram of an object tracking system 200, consistent with the disclosed embodiments. The object tracking system 200 may include a reader 202 and a controller 204. While FIG. 2 depicts a single reader 202 and a single controller 204, one of skill will understand that each of these devices may be duplicated, combined, omitted, or modified. The reader 202 may be configured to receive wireless signals from wireless devices. In some embodiments, the system 200 may include one or more readers 202. The readers 202 may be configured to receive wireless signals in accordance with one or more wireless communication technologies. For example, the readers 202 may be configured to receive wireless signals according to any one or more of Wi-Fi (e.g., an IEEE 802.11-based protocol), Bluetooth®, cellular technologies (i.e., 3G, 4G, 5G, 6G, or other 3GPP-related protocol), RFID, near field communication (NFC), global positioning system (GPS), ultra-high frequency (UHF) radio waves, or other wireless communication technologies.

In the embodiment shown in FIG. 1, the readers 202 may be mounted to one or more walls at the worksite 100. Alternatively, or in addition, the readers 202 may be mounted to one or more ceilings, and/or mounted or placed on a surface at or near the worksite 100. For example, an array of readers 202 may be located on and/or near the worksite 100, e.g., at spaced-apart intervals along the ceiling and/or walls of the worksite 100.

Referring back to FIG. 2, the reader 202 may be configured to receive wireless signals from object transport vehicle wireless devices 210*a*-210*n* (e.g., forklift tags) and wireless signals from object wireless devices 212*a*-212*n* (e.g., shipment tags attached to the object transport vehicle). The reader 202 may be configured to communicate with a controller 204 via a wired connection or wireless connection. For example, the reader 202 may be configured to send information from the object transport vehicle wireless devices 210*a*-210*n* and the object wireless devices 212*a*-212*n* to the controller 204.

Furthermore, the system may include forklift tags and the shipment tags that can be RFID tags, which may be active, semi-passive, or passive. Passive tags may be powered entirely by signals from the reader 202. Active and semi-passive tags may include a power source (e.g., a battery) to power its circuits. Semi-passive tags may also rely on the reader 202 to supply its power for certain functions, such as communicating with the reader 202. The readers 202 may use wireless non-contact radio-frequency electromagnetic fields to transfer information for the purpose of automatically identifying and tracking the forklifts 102 and the shipments 104 to which tags are attached. For example, each reader 202 may periodically send signals in an area surrounding the reader 202 and receive responses from these tags located within the area surrounding the reader 202.

The controller 204 may be configured to perform various operations based on the information received from the object transport vehicle wireless devices 210*a*-210*n* and the object wireless devices 212*a*-212*n*. The controller 204 may be configured to communicate with a location determination component 220, a score calculator 224, and a sorting component 226. While shown in FIG. 2 as separate components, the location determination component 220, the score calculator 224, and the sorting component 226 may be operations performed by the controller 204 or may be components included in the controller 204. The components 220-226 may be implemented in hardware, software, or a combination thereof. In some embodiments, the controller 204 and/or the components 220-226 may be implemented as a processor, e.g., a central processing unit (CPU) with one or more processing cores, a graphics processing unit (GPU), an application-specific integrated circuit (ASIC), a digital signal processor (DSP), a field programmable gate array (FPGA), or other circuitry.

The location determination component 220 may be configured to determine a location of object transport vehicles and objects in the worksite 100 in real time or near-real time based on wireless signals receive e.g., RFID tags, from the wireless devices on the object transport vehicle and on the objects in the worksite 100. The signals from the wireless devices may be received by the reader 202 and passed to the controller 204 and the location determination component 220. For example, assume that an object transport vehicle (e.g., forklift 102) has eight wireless devices (e.g., forklift tags) located on the vehicle. In some embodiments, the location of an object may be indicated by a point on an x, y coordinate plane with no assumed size for the object. In some embodiments, the location of the object may be determined to be within a variable radius of the determined location based on the wireless signals received from the wireless devices. For example, the variable radius may be approximately three feet or one meter.

Figure 3A:
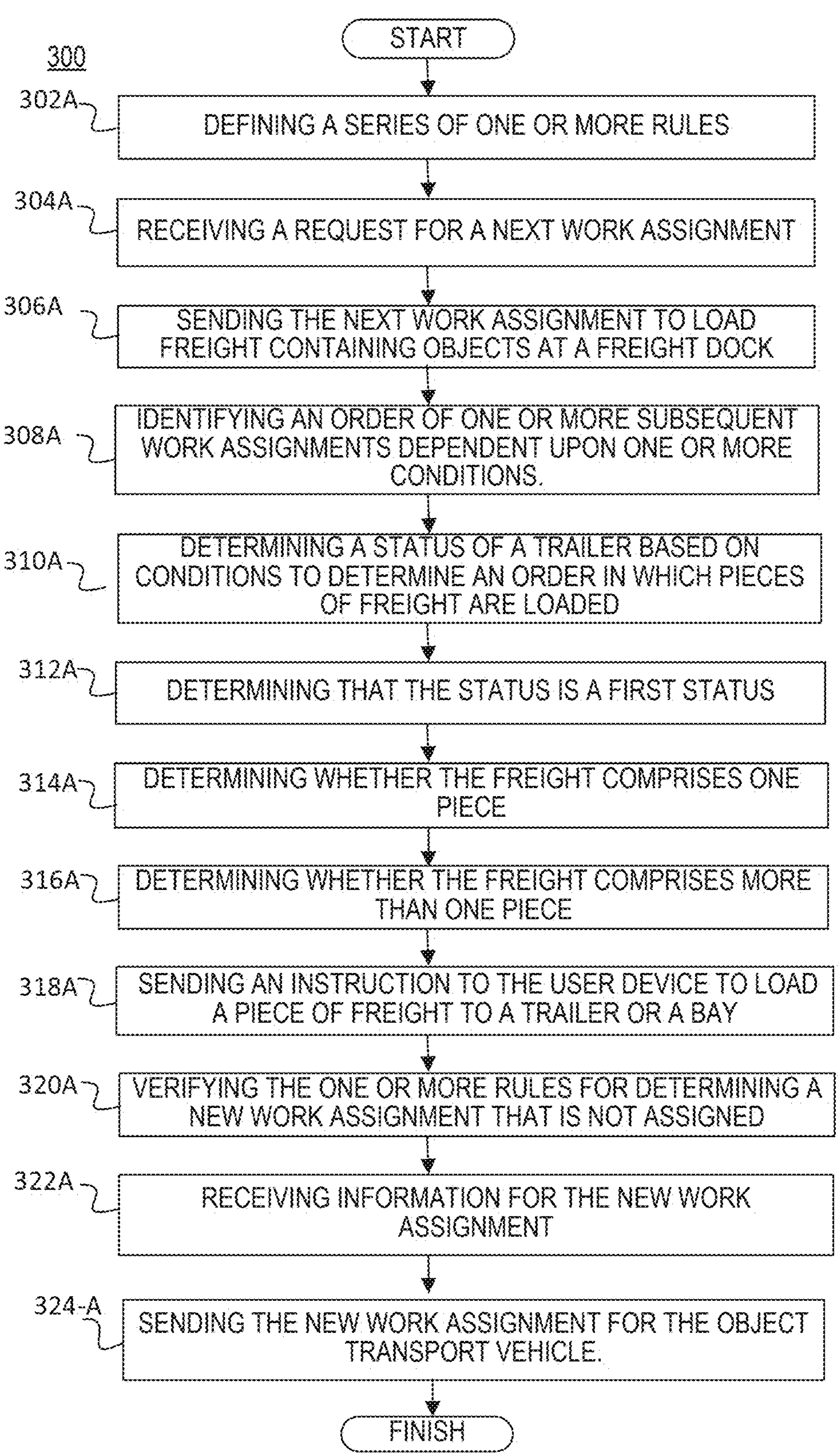
FIG. 3A is a flowchart of a method locating and tracking objects for a forklift operator, consistent with the disclosed embodiments.

FIG. 3A is a flowchart of a method 300 for locating and tracking an object for a forklift operator, consistent with the disclosed embodiments. Method 300 may begin at step 302A. Each step of method 300 may be performed by one or more devices, such as the RTLS.

In step 302A, the RTLS defines a series of one or more rules. Step 302A may comprise determining these rules by searching for these rules within a database, generating these rules through random selection, or having these rules received from a user device associated with object transport vehicle 102.

Step 304A includes receiving a request for a next work assignment, as explained above. In step 304A, the RTLS can receive a request from the user device associated with object transport vehicle 102, in order to assign the next work assignment to the forklift operator to load freight onto a trailer.

In step 306A, the RTLS sends the next work assignment to load freight at a freight dock. The work assignment is sent to load freight via the transmission of data from the RTLS to the screen of the user device associated with the forklift operator.

In step 308A, the RTLS identifies an order of one or more subsequent work assignments dependent upon one or more conditions. The identification of the order of the one or more work assignments can occur based on conditionals that include information such as the number of pieces of freight present associated with one or more work assignments, the number of one or more locations containing pieces of freight associated with one or more work assignments and the availability of a destination trailer for loading one or more pieces of freight; or a destination trailer status for the object transport vehicle.

In step 310A, the RTLS determines a status of the destination trailer based on or more conditions to determine an order in which pieces of freight are to be loaded.

Furthermore in step 312A, the RTLS can then determine that the status is a first status.

Steps 314A and 316A are discussed below in further detail with respect to FIGS. 3B and 3C, respectively.

In step 318A, the RTLS may also determine that the status is a second status, in which the RTLS can then instruct the user device to load a piece of freight.

In step 320A, the RTLS can then verify the one or more rules for determining a new work assignment that is not assigned.

In step 322A, the RTLS can receive information for the new work assignment, the information based on the determination that there is no weight on any blades 114 of the object transport vehicle, as explained above.

In step 324A, the RTLS can send the new work assignment to a device associated with the object transport vehicle.

Figure 3B:
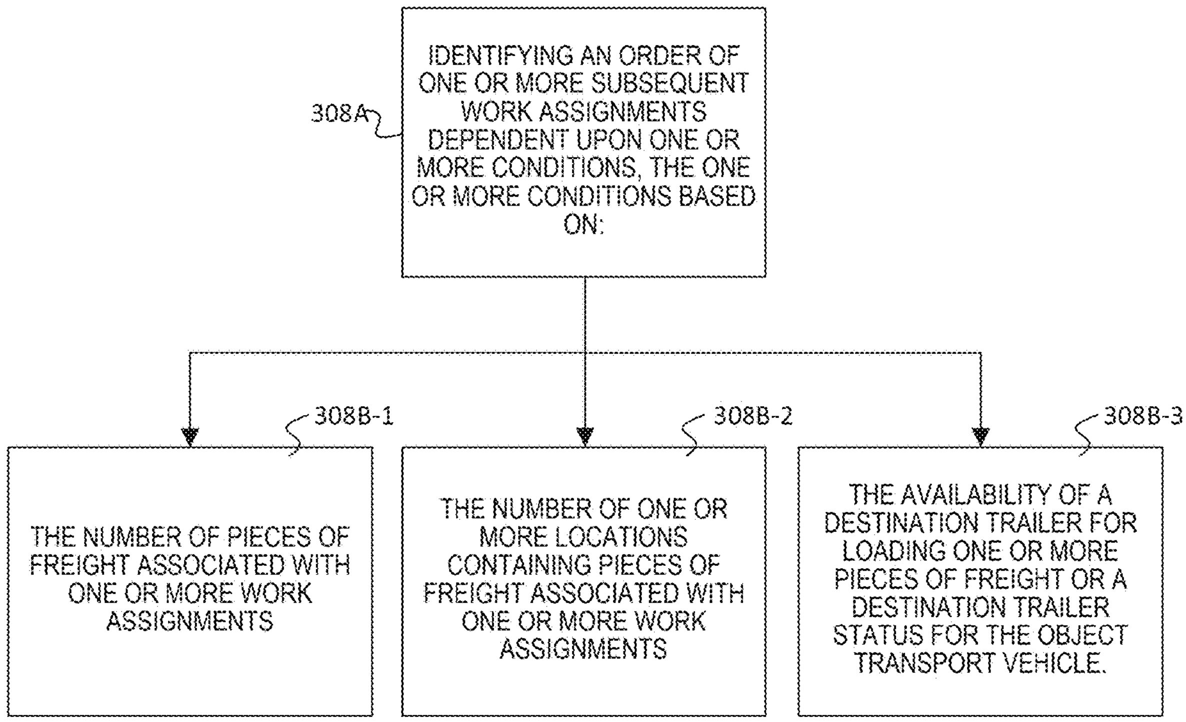
FIG. 3B is a flowchart showing substeps of the method shown in FIG. 3A, consistent with the disclosed embodiments.

FIG. 3B is a block diagram of the flowchart of a method 300 for locating and tracking an object for a forklift operator. In step 308A, the RTLS identifies an order of one or more subsequent work assignments dependent upon one or more conditions. The identification of the order of the one or more work assignments can occur based on conditions that include information such as at 308B-1 which represents the number of pieces of freight associated with one or more work assignments. At block 308B-2, this can include the number of one or more locations containing pieces of freight associated with one or more work assignments. At block 308B-3 this can also include the availability of a destination trailer for loading one or more pieces of freight or a destination trailer status for the object transport vehicle.

Figure 3C:
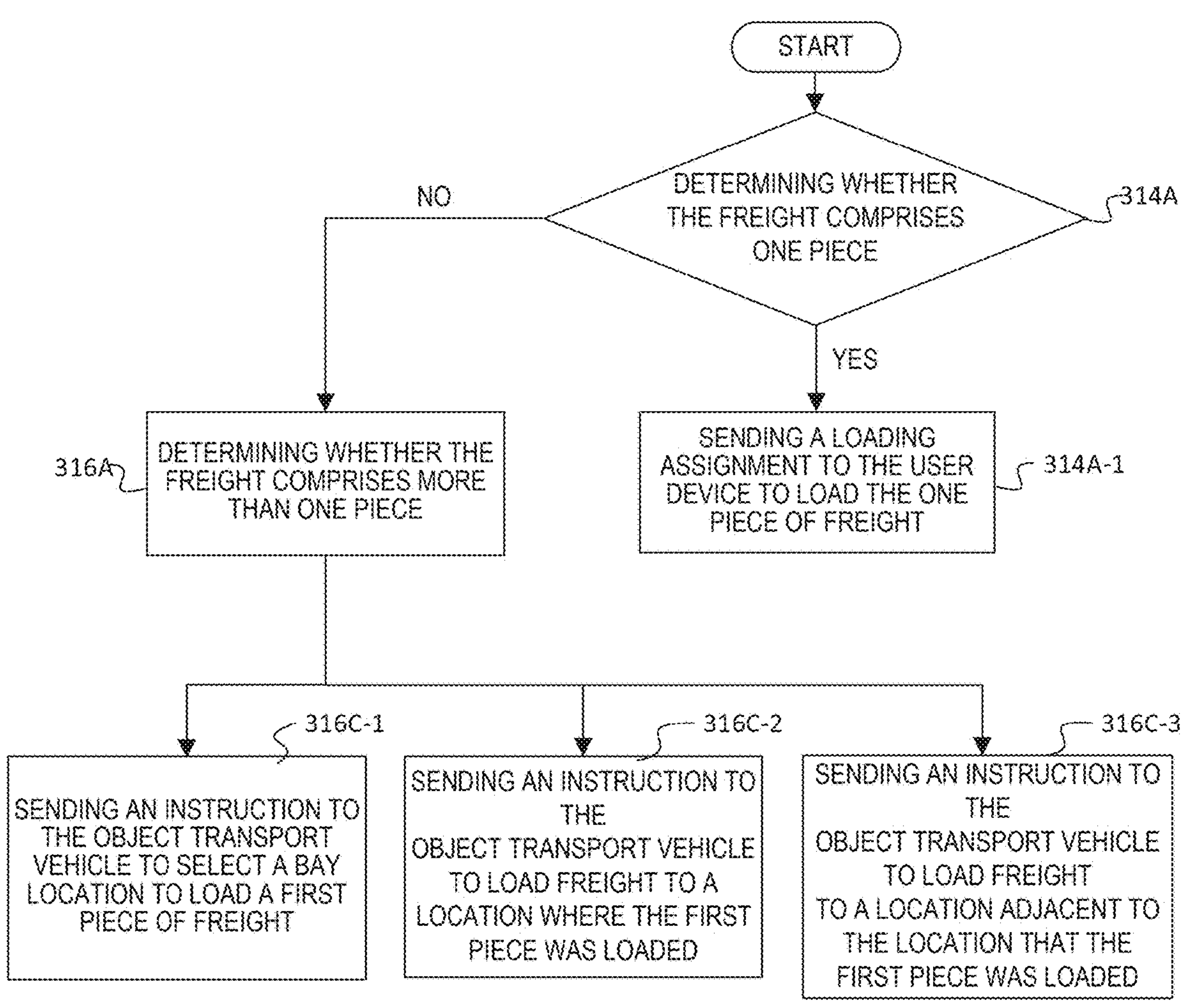
FIG. 3C is a flowchart showing substeps of the method shown in FIG. 3A, consistent with disclosed embodiments.

FIG. 3C is an expanded view the flowchart method for locating and tracking objects for a forklift operator, consistent with disclosed embodiments. In step 314A, the RTLS may determine whether the freight consists of one piece. If "YES," then step 314A can send a loading assignment to the user device to load the one piece of freight. If it is determined to be "NO", then at step 316A, based on determining that the freight comprises more than one piece, the RTLS can perform the following operations of: step 316C-1 of sending an instruction to the object transport vehicle to select a bay location to load a first piece of freight, step 316C-2 of sending an instruction to the object transport vehicle to load a piece of freight to a location where the first piece was loaded, or, step 316C-3 of sending an instruction to the object transport vehicle to load a piece of freight to a location adjacent to the location that the first piece was loaded.

Figure 4:
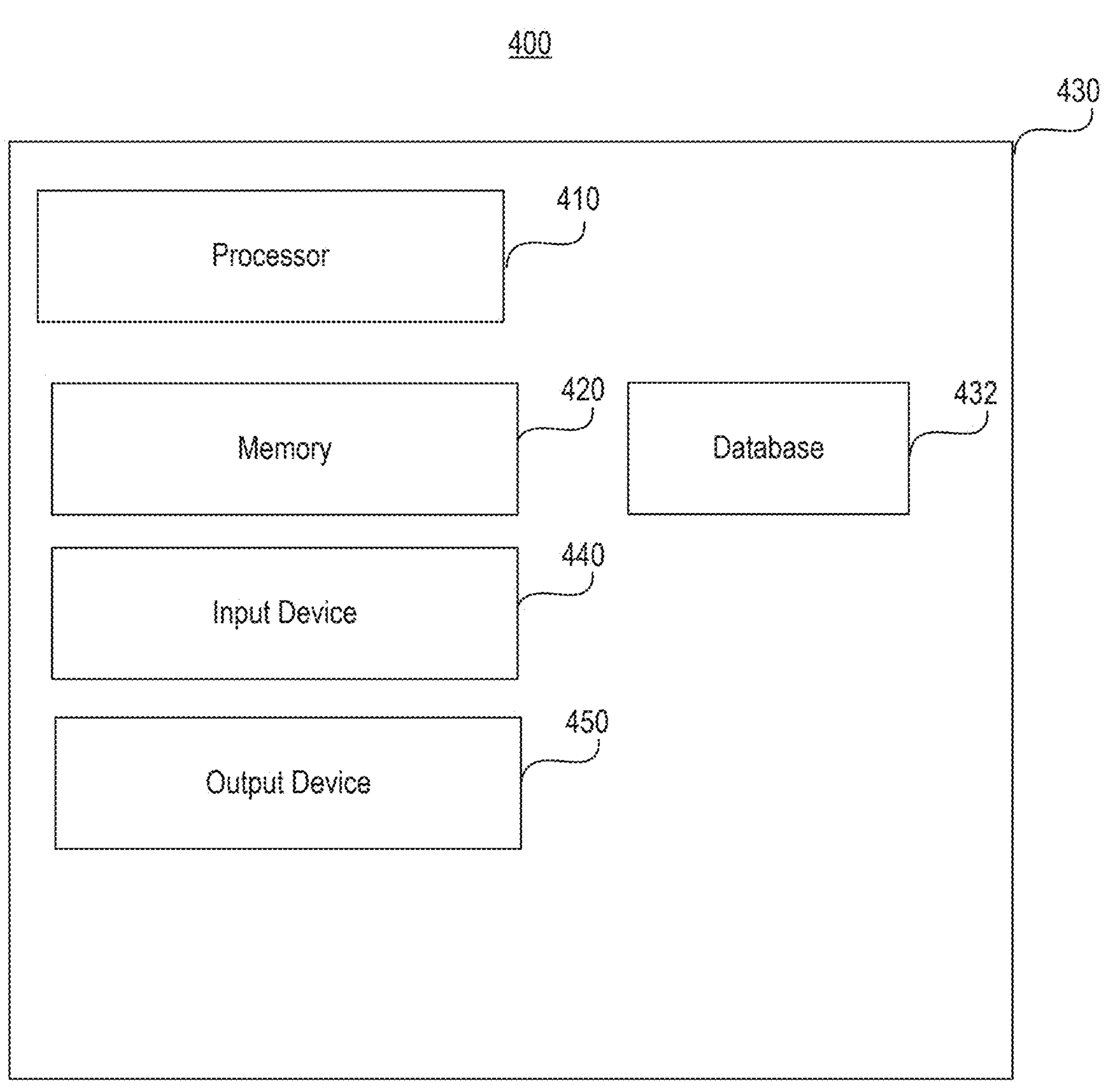
FIG. 4 is a block diagram showing an exemplary computational device, consistent with disclosed embodiments.

FIG. 4 is a block diagram 400 showing an example computing device 430 consistent with the disclosed embodiments. Computing device 430 may include one or more dedicated processors and/or memories. For example, computing device 430 may include a processor (or multiple processors) 410, and a memory (or multiple memories) 420. For example, computing device 430 may include the managing data that is received from the user device, which function as a device that can receive signals from at least one or more RF tracking tags and updates the system in real-time.

Processor 410 may take the form of, but is not limited to, a microprocessor, embedded processor, or the like, or may be integrated in a system on a chip (SoC). Furthermore, according to some embodiments, processor 410 may be from the family of processors manufactured by Intel®, AMD®, Qualcomm®, Apple®, NVIDIA®, or the like. The processor 410 may also be based on the ARM architecture, a mobile processor, or a graphics processing unit, etc. The disclosed embodiments are not limited to any type of processor.

Processor 410 may include one or more storage devices configured to store instructions. The disclosed embodiments are not limited to particular software programs or devices configured to perform dedicated tasks. For example, the processor 410 may store a single program, such as a user-level application, which performs the functions associated with the disclosed embodiments, or may comprise multiple software programs. Furthermore, processor 410 may include one or more storage devices configured to store data for use by the programs. Processor 410 may include, but is not limited to a hard drive, a solid-state drive, a CD-ROM drive, a peripheral storage device (e.g., an external hard drive, a USB drive, etc.), a network drive, a cloud storage device, or any other storage device.

In some embodiments, memory 420 may include input device 440. Computing device 430 may include one or more digital and/or analog devices that allow computing device 430 to communicate with other machines and devices, such as other components of system 100. Computing device 430 may include one or more input/output devices. For example, memory 420 can store data and instructions that processor 410 needs to access to coordinate freight movements. Memory 420 may be used to store information about shipments, routes, shipping schedules or any other pertinent information. Input device 440 may be configured to receive input from the user of computing device 430, and one or more components of computing device 430 may perform one or more functions in response to the input received. In some embodiments, input device 440 may include an interface displayed on a touchscreen (e.g., output device 450). For example, input device 440 can enable for a user to interact with the RTLS-software by providing it with data such as using a keyboard or barcode scanner that can be used to input shipment or work assignment details, in which this information can then be used to determine the next most optimal work assignment. Output device 450 may include a screen for displaying communications to a user such as displaying work assignment statuses and updates about the work assignments. For example, output device 450 may include a display configured to display the information relating to the work assignment. Computing device 430 may include other components known in the art for interacting with a user. Output device 450 may also include one or more digital and/or analog devices that allow a user to interact with system 100, such as touch sensitive area, keyboard, buttons, or microphones.

In some embodiments, computing device 430 (or any component of computing device 430) may include a database 432. Database 432 may be included on a volatile or non-volatile, magnetic, semiconductor, tape, optical, removable, non-removable, or other type of storage device or tangible or non-transitory computer-readable medium. When database 432 is not part of computing device 430, computing device 430 may exchange data with database 432 via a communication link. Database 432 may include one or more memory devices that store data and instructions used to perform one or more features of the disclosed embodiments. Database 432 may include any suitable databases, ranging from small databases hosted on a workstation to large databases distributed among data centers. Database 432 may also include any combination of one or more databases controlled by memory controller devices (e.g., server(s), etc.) or software. For example, database 432 may include document management systems, Microsoft SQL™ databases, SharePoint™ databases, Oracle™ databases, Sybase™ databases, other relational databases, or non-relational databases, such as mongo and others.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, Go, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations, and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. Disclosed embodiments may, moreover, include any one of the features in the claims, alone or in combination with one or more other feature in the claims, whether implemented as a method, by at least one processor, and/or stored as executable instructions on non-transitory computer readable media.

It is intended, therefore, that the specification and examples be considered as illustrative only, with a true scope being indicated by the following claims and their full scope of equivalents.

What is claimed is:

1. A computer-implemented method for determining a next work assignment for an object transport vehicle in a freight handling system including a processor, the method comprising:

defining, using at least one processor, a series of one or more rules, the series of one or more rules weighted by one or more weights;

receiving from a user device associated with an object transport vehicle, a request for a next work assignment;

sending, to the user device, the next work assignment for the object transport vehicle to load freight at a freight dock;

identifying an order of one or more subsequent work assignments dependent upon one or more conditions, the one or more conditions based on information associated with the next work assignment sent to the user device associated with the object transport vehicle, the information further including:

a number of pieces of freight associated with at least one of the one or more subsequent work assignments;

one or more locations of all of the one or more pieces of freight associated with at least one of the one or more subsequent work assignments;

a destination trailer for loading the one or more pieces of freight; or a destination trailer status for the object transport vehicle;

determining a status of the destination trailer based on or more conditions to determine an order in which pieces of freight are to be loaded;

based on determining that the status is a first status:

determining whether the freight associated with at least one of the one or more subsequent work assignments comprises one piece;

based on determining that the freight comprises one piece, sending a loading assignment to the user device to load the one piece of freight;

based on determining that the freight comprises more than one piece, performing at least one of:

sending an instruction to the user device associated with the object transport vehicle to select a bay location to load a first piece of freight, sending an instruction to the user device associated with the object transport vehicle to load a piece of freight to a location where the first piece was loaded, or sending an instruction to the user device for the object transport vehicle to load a piece of freight to a location adjacent to the location that the first piece was loaded;

based on determining that the status is a second status, sending an instruction to the user device to load a piece of freight to one of a trailer or a bay;

verifying the one or more rules for determining a new work assignment that is not assigned;

receiving, information associated with the new work assignment, the information being based on the determination that there is no weight on any blades of the object transport vehicle; and sending to the user device associated with the object transport vehicle, the new work assignment for the object transport vehicle.

2. The method of claim 1, wherein at least one of the one or more rules are defined by utilizing data associated with a bay's freight, the bay's freight including a determination of when to relocate based on historical characteristic data predicting desired movements or relocation into the trailer.

3. The method of claim 1, further comprising determining that the trailer is eligible to be unloaded based on at least one of historical usage patterns of the trailer, past supply levels required for unloading the trailer, or distribution of items within the trailer.

4. The method of claim 1, wherein at least one of the one or more rules is configured to prioritize freight from a given bay or freight from the trailer.

5. The method of claim 1, wherein at least one of the one or more rules is defined according to a delta value consisting of a current and cut time, wherein the cut time includes the time that the trailer is required to depart the freight dock.

6. The method of claim 5, wherein the one or more rules comprises determining whether an action prioritizes a duration exceeding a configurable amount, and in response the action is reassigned to an alternate object transport vehicle by notifying that an assignment has been withdrawn from a current object transport vehicle.

7. The method of claim 6, wherein the one or more rules includes the action of prioritizing when a notification is sent to the user device indicating when the next work assignment has been withdrawn from the freight dock.

8. The method of claim 1, further comprising combining the one or more rules and associated weights to determine the subsequent work assignment that is assigned to the user device.

9. The method of claim 1, wherein the subsequent work assignment includes a new assignment being issued upon the action being successfully completed.

10. The method of claim 1, wherein the status of the destination trailer comprises one or more statuses grouped according to fulfillment of one or more conditions.

11. A system for determining a next work assignment for an object transport vehicle in a freight handling system including a processor, the method comprising:

defining, using at least one processor, a series of one or more rules, the series of one or more rules weighted by one or more weights;

receiving from a user device associated with an object transport vehicle, a request for a next work assignment;

sending, to the user device, the next work assignment for the object transport vehicle to load freight at a freight dock;

identifying an order of one or more subsequent work assignments dependent upon one or more conditions, the one or more conditions based on information associated with the next work assignment sent to the user device associated with the object transport vehicle, the information further including:

a number of pieces of freight associated with at least one of the one or more subsequent work assignments;

one or more locations of all of the one or more pieces of freight associated with at least one of the one or more subsequent work assignments;

a destination trailer for loading the one or more pieces of freight; or a destination trailer status for the object transport vehicle;

determining a status of the destination trailer based on or more conditions to determine an order in which pieces of freight are to be loaded;

based on determining that the status is a first status:

determining whether the freight associated with at least one of the one or more subsequent work assignments comprises one piece;

based on determining that the freight comprises one piece, sending a loading assignment to the user device to load the one piece of freight;

based on determining that the freight comprises more than one piece, performing at least one of:

sending an instruction to the user device associated with the object transport vehicle to select a bay location to load a first piece of freight, sending an instruction to the user device associated with the object transport vehicle to load a piece of freight to a location where the first piece was loaded, or sending an instruction to the user device for the object transport vehicle to load a piece of freight to a location adjacent to the location that the first piece was loaded;

based on determining that the status is a second status, sending an instruction to the user device to load a piece of freight to one of a trailer or a bay;

verifying the one or more rules for determining a new work assignment that is not assigned;

receiving, information associated with the new work assignment, the information being based on the determination that there is no weight on any blades of the object transport vehicle; and sending to the user device associated with the object transport vehicle, the new work assignment for the object transport vehicle.

12. The system of claim 11, wherein at least one of the one or more rules are defined by utilizing data associated with a bay's freight, the bay's freight including a determination of when to relocate based on historical characteristic data predicting desired movements or relocation into the trailer.

13. The system of claim 11, further comprising determining that the trailer is eligible to be emptied based on at least one of historical usage patterns of the trailer, past supply levels required for emptying the trailer, or distribution of items within the trailer.

14. The system of claim 11, wherein at least one of the one or more rules is configured to prioritize freight from a given bay or freight from the trailer.

15. The system of claim 11, wherein at least one of the one or more rules is defined according to a delta value consisting of a current and cut time, wherein the cut time includes the time that the trailer is required to depart the freight dock.

16. The system of claim 15, wherein the one or more rules comprises determining whether an action prioritizes a duration exceeding a configurable amount, and in response the action is reassigned to an alternate object transport vehicle by notifying that an assignment has been withdrawn from a current object transport vehicle.

17. The system of claim 16, wherein the one or more rules includes the action of prioritizing when a user associated with the user device is notified of when the next work assignment has been withdrawn from the freight dock.

18. The system of claim 11, further comprising combining the one or more rules and associated weights to determine the subsequent work assignment that is assigned to the user device.

19. The system of claim 11, wherein the subsequent work assignment includes a new assignment being issued upon the action being successfully completed.

20. The system of claim 11, wherein the status of the destination trailer comprises one or more statuses grouped according to fulfillment of one or more conditions.

* * * * *